(12) United States Patent
Unno et al.

(10) Patent No.: US 10,786,974 B2
(45) Date of Patent: *Sep. 29, 2020

(54) STAINLESS STEEL FOIL

(71) Applicant: NIPPON STEEL CHEMICAL & MATERIAL CO., LTD., Tokyo (JP)

(72) Inventors: Hiroto Unno, Tokyo (JP); Naoya Sawaki, Tokyo (JP); Naoki Fujimoto, Tokyo (JP); Masahiro Fukuda, Tokyo (JP); Tomohiro Uno, Tokyo (JP); Toru Inaguma, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 15/750,947

(22) PCT Filed: Aug. 17, 2016

(86) PCT No.: PCT/JP2016/074026
§ 371 (c)(1),
(2) Date: Feb. 7, 2018

(87) PCT Pub. No.: WO2017/030148
PCT Pub. Date: Feb. 23, 2017

(65) Prior Publication Data
US 2018/0229476 A1    Aug. 16, 2018

(30) Foreign Application Priority Data
Aug. 19, 2015 (JP) ................. 2015-161984

(51) Int. Cl.
| | |
|---|---|
| H01M 4/66 | (2006.01) |
| C22C 38/00 | (2006.01) |
| B32B 15/08 | (2006.01) |
| C21D 9/48 | (2006.01) |
| C21D 1/74 | (2006.01) |
| C21D 8/02 | (2006.01) |
| C25D 11/38 | (2006.01) |
| H01M 2/02 | (2006.01) |

(52) U.S. Cl.
CPC ............ B32B 15/08 (2013.01); C21D 1/74 (2013.01); C21D 8/0236 (2013.01); C21D 8/0257 (2013.01); C21D 8/0273 (2013.01); C21D 9/48 (2013.01); C22C 38/00 (2013.01); C25D 11/38 (2013.01); *B32B 2457/10* (2013.01); *C21D 2211/001* (2013.01); *C21D 2211/005* (2013.01); *H01M 2/02* (2013.01)

(58) Field of Classification Search
CPC ...... C21D 1/74; C21D 8/0236; C21D 8/0257; C21D 8/0273; C21D 9/48; C22C 38/00; C25D 11/38; H01M 4/66; H01M 4/68; H01M 4/70
See application file for complete search history.

(56) References Cited

U.S. PATENT DOCUMENTS

| | | | |
|---|---|---|---|
| 6,187,452 B1 | 2/2001 | Muto et al. | |
| 10,323,294 B2 * | 6/2019 | Unno | ........................ C21D 9/48 |
| 2009/0029245 A1 | 1/2009 | Ibaragi et al. | |
| 2016/0160328 A1 | 6/2016 | Mizutani et al. | |
| 2017/0009312 A1 | 1/2017 | Unno et al. | |
| 2018/0282834 A1 * | 10/2018 | Unno | ................... C21D 8/0263 |

FOREIGN PATENT DOCUMENTS

| | | |
|---|---|---|
| CN | 101381842 A | 3/2009 |
| JP | 2000-273586 A | 10/2000 |
| JP | 2003-239044 A | 8/2003 |
| JP | 2004-52100 A | 2/2004 |
| JP | 2007-168184 A | 7/2007 |
| JP | 2010-33782 A | 2/2010 |
| JP | 2012-92360 A | 5/2012 |
| JP | 2012-92361 A | 5/2012 |
| JP | 2013-41788 A | 2/2013 |
| JP | 2015-74798 A | 4/2015 |
| WO | WO 2015/015728 A1 | 2/2015 |
| WO | WO 2015/122523 A1 | 8/2015 |

OTHER PUBLICATIONS

Extended European Search Report for corresponding European Application No. 16837137.5, dated Dec. 19, 2018.
International Search Report (Form PCT/ISA/210) for Application No. PCT/JP2016/074026, dated Nov. 15, 2016.

* cited by examiner

*Primary Examiner* — James Lee
(74) *Attorney, Agent, or Firm* — Birch, Stewart, Kolasch & Birch, LLP

(57) ABSTRACT

The present invention provide a ferritic stainless steel foil having a high thickness precision even with a thickness 60 μm or less ultrathin stainless steel foil and simultaneously having a plastic deformation ability and good elongation at break, that is, having a good press-formability (deep drawing ability).

The present invention is a stainless steel foil having a thickness of 5 μm to 60 μm, wherein a recrystallization ratio of said stainless steel foil is 90% to 100%, a surface layer of said stainless steel foil has a nitrogen concentration of 1.0 mass % or less, three or more crystal grains are contained in the thickness direction of said stainless steel foil, an average crystal grain diameter "d" of said crystal grains is 1 μm to 10 μm, and, when said thickness is "t" (μm), an area ratio of crystal grains having a crystal grain diameter of t/3 (μm) or more is 20% or less.

20 Claims, No Drawings

STAINLESS STEEL FOIL

TECHNICAL FIELD

The present invention relates to stainless steel foil. In particular, it relates to stainless steel foil provided with good formability regardless of being extremely thin.

BACKGROUND ART

Along with the increasingly smaller size and lighter weight of electronic equipment, electronic equipment has been made more portable and mobile. Smaller size and lighter weight of the lithium ion batteries and other batteries mounted in many electronic equipment have therefore also been sought. In particular, the smaller size and lighter weight of batteries demanded from smartphones and other electronic equipment demand the cutting edge level of specifications of the times.

At the present time, the battery cases of lithium ion batteries designed for smartphones are being made using cans of thin sheets of aluminum or aluminum foil on which a resin film is laminated. In particular, resin film-laminated aluminum foil is being made much use of for the purpose of improving the capacity density per volume. Recently, thinner sheath materials have been sought for the purpose of further reduction of size and weight. However, with a base material of aluminum foil, if made thinner, pinholes easily form in the process of production and a moisture barrier property cannot be secured. Further, there was the problem that a thin form causes a drop in the puncture strength and rigidity and makes it impossible to secure strength against shock from the outside or internal expansion of the battery. Therefore, with aluminum foil, a limit has begun to be seen with regard to further reduction of size.

Therefore, attention has been focused on foil comprised of stainless steel due to its higher strength and rigidity compared with aluminum (stainless steel foil). However, stainless steel is higher than aluminum in specific gravity, so extremely thin stainless steel foil is being sought. For use for battery cases, 60 μm or less extremely thin stainless steel foil is required or else application to the battery cases sought for current electronic products would not be possible.

As extremely thin stainless steel foil, PLT 1 discloses stainless steel foil of a thickness of 25 μm or less. With ultrathin stainless steel foil, voids accompanied with cracking occur from the etched end faces in the rolling direction. PLT 1 discloses an invention limiting the number of 5 μm or more inclusions so as to solve this problem.

Further, as examples of application of stainless steel foil to battery cases, there are PLTs 2 to 4. PLT 2 discloses examples of press-forming thickness 20 to 100 μm stainless steel foil to obtain battery sheaths, PLT 3 thickness 100 μm stainless steel foil, and PLT 4 thickness 40 to 150 μm stainless steel foil.

CITATION LIST

Patent Literature

PLT 1: Japanese Patent Publication No. 2000-273586A
PLT 2: Japanese Patent Publication No. 2004-52100A
PLT 3: Japanese Patent Publication No. 2013-41788A
PLT 4: Japanese Patent Publication No. 2012-92361A
PLT 5: Japanese Patent Publication No. 2007-168184A

SUMMARY OF INVENTION

Technical Problem

Normally, ultrathin stainless steel foil, such as when used for springs used for head suspensions for HDDs (hard disk drives), is not annealed after being rolled, but is stamped or etched as rolled or after heat treatment such as tension annealing for improving the tensile strength or yield strength. The art of PLT 1 solves the technical problems which occur during such etching.

However, in the case of a battery case, press-forming (deep drawing) is performed, so press-formability is demanded. In usual stainless steel foil of a thickness of 100 μm or more, to improve the workability, annealing at 1000° C. or so is performed at the final process to lower the internal dislocation density and secure a good elongation at break. However, if the thickness of the stainless steel foil becomes 60 μm or less, the plastic deformation ability remarkably falls and the press-formability (drawability) deteriorates. The inventors engaged in intensive studies and as a result discovered that the reason is that if applying the conventional annealing treatment to stainless steel foil of a thickness of 60 μm or less, coarsening of the crystal grains in the stainless steel foil is accelerated, so the average crystal grain diameter of the crystal grains becomes too large. In particular, they discovered that this is because the number of crystal grains in the thickness direction ended up about 1 to 2.

Furthermore, the inventors discovered that even when suppressing coarsening of the crystal grains and making the average crystal grain diameter of the crystal grains smaller, if there are crystal grains with large crystal grain diameters compared with the thickness, the crystal grains cannot sufficiently deform and therefore fracture etc. occur.

PLT 2 describes examples of press-forming thickness 20 to 100 μm stainless steel foil for application to battery cases. However, with the state of the art at the time, there was no awareness of the issue of press-formability of ultrathin stainless steel foil such as foil with a thickness of under 60 μm. The problems could not be grasped. In particular, there were the problems of press-formability (plastic deformation ability) when working the foil into a battery case and of the resin film peeling off at a corner part of the battery case. Even if the resin peels off locally, if the foil ends up being used as a battery case as it is, during long term contact with the electrolyte, the resin will further peel off starting from that location and the function as a battery case will be obstructed.

PLT 3 also describes an example of application of thickness 100 μm stainless steel foil to a battery case. However, with thickness 100 μm stainless steel foil, the above-mentioned such problems relating to press-formability do not arise. Even if they did arise, there was no awareness of the issue in PLT 3, so no means for solution was proposed.

PLT 4 describes examples of application of thickness 40 to 150 μm stainless steel foil to battery sheaths. The art of PLT 4 nitrides the surface layer of stainless steel foil to suppress the formation of work-induced martensite at the time of press-forming. Due to this, it explains that it is possible to secure peeling resistance at the hot melt bonded parts of the stainless steel foil and resin and suppress whitening of the resin after press-forming. Furthermore, it explains that surface relief formed due to the work-induced martensite transformation is suppressed and the flatness of the surface is maintained, so the press-formability becomes better. However, it was learned that if nitriding the surface layer of stainless steel foil, that part will harden, so at the time of press-forming, the foil would easily suffer splitting (cracks). In particular, if the thickness of stainless steel foil becomes an ultrathin 60 μm or less, the effect of the hardened parts caused by nitriding of the surface layer becomes relatively large and can no longer be ignored. That is, if press-forming ultrathin stainless steel foil nitrided on its surface layer, cracks will form on the surface and a sufficient press-formability will not be obtained, so the problem will remain.

Note that, in PLT 4, almost all of the working examples had thicknesses of 100 μm, so there was no awareness of the remarkable issues involved in thickness 60 μm or less stainless steel foil. The thickness 40 μm working examples were poor in formability, but this was explained as being in the allowable range. Furthermore, there were no working examples of less thicknesses, so the art described in PLT 4 cannot be applied to 60 μm or less ultrathin stainless steel foil.

The inventors engaged in intensive studies and as a result discovered that in thickness 60 μm or less stainless steel foil, as explained above, there end up being just one to two crystal grains in the thickness direction thereby causing a drop in the plastic deformation ability, that is, deterioration of the press-formability. This first arises with a thickness of 60 μm or less and was not an issue in stainless steel foil thicker than 60 μm. That is, with the conventional thickness, to secure good elongation at break and thickness precision to a sufficient extent, annealing was performed at a relatively high temperature, so the crystal grains inevitably coarsened. Even under such circumstances, since the foil was large in thickness, a certain number or more of crystal grains were present in the thickness direction and therefore there was no effect on deterioration of the plastic deformation ability.

Furthermore, the inventors discovered that with just making the average crystal grain diameter of the crystal grains smaller, the press-formability is not sufficiently improved and that it is necessary to narrow the distribution of crystal grain diameters in accordance with the thickness, that is, reduce the existing ratio of crystal grains with a large crystal grain diameter in accordance with the thickness. This is because if there are crystal grains of a large crystal grain diameter compared with the thickness, they cannot sufficiently deform in orientations disadvantageous to plastic deformation and end up forming starting points of fracture etc.

Further, the inventors discovered that even if the foil is thin, the press-formability can be improved by securing the above-mentioned number of crystal grains without nitriding the surface layer. The reason is the following: the smaller the thickness is, the greater the effect of hardening of the surface at the time of nitriding becomes and thereby the foil ends up with splitting at the time of press-forming.

On the other hand, if annealing at a lower temperature for the purpose of suppressing coarsening of the crystal grains, it is not possible to lower the dislocation density and not possible to secure a good elongation at break. Furthermore, the thickness precision also deteriorates.

Further, even if, like in PLT 4, nitriding the surface layer so as to refine the crystal grains and lessen surface relief, if becoming a thickness of 60 μm or less, the above problems due to nitriding of the surface layer arise.

Therefore, the present invention has as its object to secure a high thickness precision even with a thickness 60 μm or less ultrathin stainless steel foil and simultaneously secure a plastic deformation ability and good elongation at break, that is, to secure a good press-formability (deep drawing ability). As a specific indicator, if ultrathin stainless steel foil, the surface roughness affects the thickness precision, so to secure the thickness precision, the object is to suppress the surface roughness Rz to 1/10 of the thickness. Further, the object is to secure an elongation at break of the level of conventional stainless steel foil of 10% or more. Another object is to secure the same level of plastic deformation ability as conventional stainless steel foil.

Further, the object is to secure a good electrolyte resistance (resin film not peeling off even if kept in contact with electrolyte over a long period of time) when made into a battery case.

Note that, the lower limit of thickness does not have to be especially determined, but the realistic limit value of thickness of the foil after being rolled is about 5 μm, so the thickness of the stainless steel foil according to the present invention is made 5 to 60 μm.

Solution to Problem

To solve the above problem, the inventors engaged in intensive studies and obtained the following discoveries.

(A) By making the number of crystal grains in the thickness direction three or more, the plastic deformation ability is secured. Furthermore, the crystal grains are refined (the average crystal grain diameter is made smaller) and the distribution of crystal grain diameter is made narrower in accordance with the thickness.

(B) To secure three or more crystal grains and reduce the distribution of crystal grain diameter, it is sufficient to increase the dislocations forming nucleation sites by a high draft rolling and then annealing.

(C) To secure an elongation at break of 10% or more, the foil can be annealed at a high temperature corresponding to the dislocation density to make the recrystallization ratio 90% or more. Furthermore, to suppress splitting (cracking) due to surface hardening, it is important to suppress nitriding of the surface layer as much as possible.

(D) If simultaneously securing the above plastic deformation ability and elongation at break, a high thickness precision having a surface roughness (Rz (JIS B 0601: 2001)) of 100 nm to 1/10 of the thickness can also be simultaneously secured.

(E) By making the number of crystal grains in the thickness direction three or more and further making the nitrogen concentration of the surface layer 1.0 mass % or less, electrolyte resistance can also be secured. That is, to improve electrolyte resistance, it is important to suppress skin coarsening of the stainless steel foil surface at the corner parts after press-forming and to maintain adhesion with the resin film.

The present invention was made based on the above discoveries and has as its gist the following:

(1) A stainless steel foil having a thickness of 5 μm to 60 μm, wherein a recrystallization ratio of the stainless steel foil is 90% to 100%, a surface layer of the stainless steel foil has a nitrogen concentration of 1.0 mass % or less, three or more crystal grains are contained in the thickness direction of the stainless steel foil, an average crystal grain diameter "d" of the crystal grains is 1 μm to 10 μm, and, when the thickness is "t" (μm), an area ratio of crystal grains having a crystal grain diameter of t/3 (μm) or more is 20% or less.

(2) The stainless steel foil according to (1), wherein the thickness is 5 μm to 25 μm.

(3) The stainless steel foil according to (1) or (2), wherein a surface roughness Rz is 100 nm or more, and 1/10 or less of the thickness.

(4) The stainless steel foil according to any one of (1) to (3), wherein an elongation at break is 10% or more.
(5) The stainless steel foil according to any one of (1) to (4), wherein the stainless steel foil is ferritic stainless steel foil.
(6) The stainless steel foil according to any one of (1) to (4), wherein the stainless steel foil is austenitic stainless steel foil.
(7) The stainless steel foil according to any one of (1) to (6), wherein a resin film laminated on at least one surface of the stainless steel foil.

Advantageous Effects of Invention

The thickness 60 μm or less ultrathin stainless steel foil according to the present invention can secure a high thickness precision and simultaneously secure a plastic deformation ability and good elongation at break, that is, can secure a good press-formability (deep drawing ability). Furthermore, it is possible to secure good electrolyte resistance when working the foil into a battery case. Due to this, it is possible to apply this to a battery case etc. of a lithium ion battery etc. designed for smaller size and lighter weight.

DESCRIPTION OF EMBODIMENTS

The present invention will be explained in detail below. Note that unless otherwise indicated, the explanation will be given with reference to austenitic stainless steel as an example.

1. Stainless Steel Foil
Material of Stainless Steel
The stainless steel foil according to the present invention is not particularly limited so long as comprised of stainless steel. It may be austenitic such as SUS304 or may be ferritic such as SUS430. However, in the case of ferritic stainless steel, compared with austenitic steel, the suitable temperature for annealing becomes lower by about 100° C. If considering this point, it was confirmed that according to the method of production of stainless steel foil explained later, it was possible to obtain predetermined characteristics both with austenitic steel and with ferritic steel.
Thickness of 5 to 60 μm
The stainless steel foil according to the present invention covers foil of a thickness of 5 to 60 μm. If 60 μm or less, the problems due to the crystal grains arise as explained above. These problems become more remarkable as the foil is thinner. Further, it is possible to contribute to reduce thickness of the battery case etc. Therefore, the upper limit of the foil thickness may be determined toward a thinner value. That is, the thickness is preferably limited to 50 μm or less, more preferably 40 μm or less, still more preferably 25 μm or less. Further, the lower limit of thickness is not particularly set, but if considering the limits in manufacturing technology, a thickness of 5 μm may be made the lower limit. Even with a thickness of 5 μm, the effect according to the present invention can be enjoyed.
Three or More Crystal Grains in Thickness Direction
The stainless steel foil according to the present invention preferably has three or more crystal grains in the thickness direction. The number of crystal grains in the thickness direction can be found as follows: On any cross-section in the thickness direction, crystal grain diameters are measured based on JIS G 0551 to find the average crystal grain diameter. The thickness is divided by the average crystal grain diameter, and the quotient is used as the number of crystal grains in the thickness direction. Note that, when the crystal grains are equi-axed grains, it is also possible to measure the crystal grains in the plane perpendicular to the thickness direction to calculate the average crystal grain diameter.

Alternatively, any three or more lines are drawn in any cross-section in the thickness direction, the number of crystal grains which these lines cross is counted, and the arithmetic mean of these is taken. At that time, if a crystal grain contacts the surface, it is counted as 0.5 grain. Further, when a line runs along a crystal grain boundary, it is possible to count the plurality of crystals forming the crystal grain boundary. However, the two end parts in the width direction of the stainless steel foil are easily affected by annealing, so are not suited for measurement of the number of crystal grains. Therefore, it is preferable to draw any line in the thickness direction excluding the two end parts in the width direction of the stainless steel foil and measure the number of crystal grains. For example, it is possible to count the number of crystal grains at three locations of the center of the stainless steel foil in the width direction (position of ½ width from one end) and positions between the two ends and center (two positions of ¼ width and ¾ width from one end) and obtain the arithmetic mean of the same so as to evaluate the number of crystal grains in the thickness direction of the stainless steel foil. The number of crystal grains found in this way should be three or more.

For the individual crystal grains to plastically deform to any shape, it is necessary that the condition of von Mises be satisfied and a plurality of slip systems cause multi-slip. However, if the number of crystal grains in the thickness direction is small, the probability of crystal grains of orientations not satisfying the von Mises condition for the deformation direction (crystal grains inferior in deformation ability) being aligned in the thickness direction becomes higher. This being so, at the time of press-forming, these crystal grains cannot follow the deformation of the foil as a whole, so end up becoming starting points of fracture. On the other hand, if there are three or more crystal grains in the thickness direction, even if there are crystal grains inferior in deformation ability, the surrounding crystal grains can deform into any shapes and maintain the deformation of the foil as a whole, so as a result, the plastic deformation ability is improved.

Furthermore, if determining the number of crystal grains in the thickness direction in accordance with the steel type or the thickness, it is possible to better secure the plastic deformation ability, so this is preferable. Austenitic stainless steel, compared with ferritic stainless steel, more easily hardens upon being worked, so the deformation resistance is larger. Further, the greater the thickness, the greater the deformation resistance. Therefore, from the viewpoint of securing the plastic deformation ability, in the case of austenitic stainless steel, the number of crystal grains preferably is larger. Further, the greater the thickness, the greater the number of crystal grains preferably is larger.

In the case of austenitic stainless steel, if the thickness is 15 μm or more, there are preferably five or more crystal grains in the thickness direction. In particular, when the thickness is 40 μm or more, 10 or more is more preferable. On the other hand, in the case of ferritic stainless steel as well, for similar reasons, if the thickness is 15 μm or more, there are preferably four or more crystal grains in the thickness direction. In particular, when the thickness is 40 μm or more, five or more is more preferable. Due to this, it is possible to further improve the plastic deformation ability. Note that, in the case of ultrathin stainless steel foil with a thickness of 15 μm or less, the effect of the steel type or thickness on the number of crystal grains in the thickness direction is of a negligible extent.

The upper limit of the number of crystal grains is not particularly set. This is because the number of crystal grains in the thickness direction changes depending on the thickness of the ultrathin stainless steel foil. This is because the above-mentioned multi-slip is determined not by the size of the crystal grains, but by the number of crystal grains in the thickness direction.

Average Crystal Grain Diameter of 1 μm to 10 μm

In the present invention, the size of the crystal grains (crystal grain diameter based on JIS G 0051 (below, in this Description, unless otherwise indicated, referred to as the "average crystal grain diameter 'd'")) is made 1 μm to 10 μm. The average crystal grain diameter "d" is preferably 2 μm to 6 μm.

By making the average crystal grain diameter the above range, coarsening of the crystal grains is suppressed and three or more crystal grains easily become present in the thickness direction.

Area Ratio of Crystal Grains Having t/3 (μm) or More Crystal Grain Diameter of 20% or Less In the present invention, in addition to the provision regarding the average crystal grain diameter, when thickness is defined as "t" (μm), the area ratio of crystal grains having a t/3 (μm) or more crystal grain diameter is made 20% or less. As explained above, if the thickness becomes 60 μm or less, unless securing three or more crystal grains in the thickness direction, the plastic deformation ability ends up falling. At this time, even if securing three or more crystal grains in the thickness direction, a difference in plastic deformation ability arises between the case where crystal grains with a relatively large crystal grain diameter and crystal grains with a relatively small crystal grain diameter are aligned in the thickness direction and the case where crystal grains with the same extent of crystal grain diameter are aligned in the thickness direction. For example, if crystal grains with a large crystal grain diameter are present in an orientation disadvantageous to deformation, the crystal grains cannot sufficiently deform, so fracture etc. end up occurring starting from the crystal grains.

Therefore, it is preferable to reduce the ratio of crystal grains having large crystal grain diameters with respect to the thickness. In other words, the distribution of crystal grain diameters is preferably narrow. The breadth of the distribution of crystal grain diameters cannot be evaluated by the number of crystal grains in the thickness direction and the average crystal grain diameter. Therefore, in the present invention, the ratio of crystal grains having a relatively large crystal grain diameter, that is, crystal grains having t/3 (μm) or more crystal grain diameter, is made the above range so as to further enhance the press-formability of the stainless steel foil according to the present invention.

The above area ratio can be calculated in the following way. First, at the surface of the stainless steel foil, the average crystal grain diameter of the crystal grains present in a predetermined measurement field is measured based on JIS G 0551. Next, the measured crystal grains having a crystal grain diameter of t/3 (μm) or more are divided from the measured crystal grains having a crystal grain diameter of less than t/3 (μm) and the ratio of the measured crystal grains having a crystal grain diameter of t/3 (μm) or more in the area of the measurement field is calculated. This may be used as the area ratio. Alternatively, the electron back scatter diffraction (EBSD) method may be used for calculating this. First, the crystal orientations at the different measurement points are determined, the boundaries with slant angles of 15 degrees or more (excluding twinning) are made the crystal grain boundaries, and the regions surrounded by crystal grain boundaries are made the crystal grains. Further, it is possible to calculate the crystal grain diameters and areas of the crystal grains to find the area ratio of crystal grains having a crystal grain diameter of t/3 (μm) or more.

The above area ratio is preferably 10% or less.

Note that, in the present invention, when calculating the area ratio, unlike when calculating the number of crystal grains in the thickness direction, the crystal grain diameters are calculated at the surface of the stainless steel foil. This is because when calculating the distribution of crystal grains having a predetermined crystal grain diameter, it is preferable that the number of crystal grains measured be large, but it is difficult to secure a measurement field in a cross-section of extremely thin foil such as one with a thickness of 60 μm or less.

Furthermore, in the thickness direction, the crystal grains are sometimes observed to contact the foil surface and be terminated at the middle part of them. In this case, the crystal grain diameters are measured in such a terminated state, so the diameters end up being calculated smaller than the actual crystal grain diameters and the apparent crystal grain diameters end up becoming smaller. In contrast, when measuring the crystal grain diameters at the surface, the crystal grains are not terminated at the middle part of them, so there is the advantage that a crystal grain diameter distribution reflecting the actual crystal grain diameters can be obtained.

Therefore, regarding the area ratio of crystal grains with a large crystal grain diameter, even with the same material, the area ratio at the surface is measured as a larger value than the area ratio at a cross-section in the thickness direction. Therefore, if making the area ratio at the surface a predetermined value or less, since the area ratio in the thickness direction can be said to be reliably smaller than that value, in the present invention, when measuring the area ratio of crystal grains having a predetermined crystal grain diameter, this is measured at the surface.

Recrystallization Ratio of 90% to 100%

The stainless steel foil according to the present invention has to have crystal grains made finer in order to secure the plastic deformation ability, but the above problems cannot be solved by this alone. Further, to secure good elongation at break, the dislocation density has to be adjusted to a suitable level. Specifically, the structure after being rolled is worked and therefore suffers from buildup of dislocations and other lattice defects. Therefore, even if the crystal grains are fine, the dislocation density is high and the foil hardens. For this reason, it is necessary to suitably control the heat treatment conditions according to the material so as to make the structure recrystallize and obtain a low dislocation density. That is, the recrystallized structure is formed using the dislocation density as a driving force, so it is possible to utilize the reduction of the dislocation density in the recrystallized grains while suppressing coarsening of the recrystallized structure so as to secure plastic deformation ability while securing good elongation at break.

Note that, as the method for measuring the dislocation density, the etch pit method etc. may be illustrated, but the density is affected by the measurement conditions etc., so quantitative measurement is difficult. It is possible to directly measure the dislocation density by observation by a microscope, but the result depends on the observed field, so the variation is great. Therefore, the inventors discovered that by measuring the recrystallization ratio, which is a characteristic value reflecting the dislocation density, it is possible to obtain a grasp of whether suitable heat treatment had been performed.

The recrystallization ratio can be calculated by (area of recrystallized crystals)/(observed area). The "area of recrystallized crystals" can be obtained by observing any cross-section of the ultrathin stainless steel foil by an optical microscope. Alternatively, it is possible to calculate the half width of the diffraction peak of the (220) plane (austenitic) or the (211) plane (ferritic) obtained by X-ray diffraction. If the half width is 0.20 degree or less, the recrystallization ratio may be deemed 90% or more, if 0.15 degree or less, the recrystallization ratio may be deemed 95% or more, and if 0.10 degree or less, the recrystallization ratio may be deemed 100%.

The stainless steel foil according to the present invention should have a recrystallization ratio of 90% or more. If the recrystallization ratio is 90% or more, the dislocation density becomes sufficiently low and the number of crystal grains required in the thickness direction can also be secured. Preferably, the recrystallization ratio is 95% or more. This is because if the recrystallization ratio is 95% or more, even if the thickness is small, the press-formability (plastic deformation ability) is improved and the surface roughness is improved. If the number of crystal grains in the thickness direction satisfies the provisions of the present invention, the recrystallization ratio may be 100%. That is, the stainless steel foil according to the present invention as a whole may be recrystallized.

Nitrogen Concentration of Surface Layer

As explained above, when nitriding the surface of stainless steel foil, in particular if the thickness becomes smaller, various problems appear due to the hardening of the surface layer resulting from the nitriding. Therefore, the surface layer of stainless steel foil preferably is not nitrided. "The surface layer is not nitrided" means the nitrogen concentration of the surface layer is 1.0 mass % or less. Here, the "surface layer" is made the thickness where the oxygen concentration becomes half of the peak value in measurement by Auger electron spectroscopy and the "nitrogen concentration" is made the average concentration at the surface layer.

Repeating the explanation again, when the surface layer of stainless steel foil is nitrided, at the time of press-forming, the surface layer becomes harder due to the nitriding and thereby ends up forming starting points of splitting, so the press-formability ends up falling. With the stainless steel foil according to the present invention where the thickness is a thin 60 μm or less, the effect of the surface becomes relatively large, so this is a salient issue. By making the nitrogen concentration the above-mentioned range, deformation is possible without the surface layer splitting (cracking), so if there are three or more crystal grains in the thickness direction, a good press-formability is obtained. For this reason, the nitrogen concentration of the surface layer should be made 1.0 mass % or less as explained above without allowing nitrogen to concentrate at the surface layer of the stainless steel foil. The lower limit of the nitrogen concentration of the surface layer does not have to be particularly set. The lower limit becomes equal to the nitrogen content evaluated for the stainless steel foil as a whole. That is, in the case of the general SUS304, SUS430, or other type of steel not containing nitrogen, a level of content of nitrogen as an unavoidable impurity is the lower limit.

To make the nitrogen concentration of the surface layer of the stainless steel foil 1 mass % or less, it is possible to control the nitrogen concentration in the annealing atmosphere to 0.1 vol % or less.

Surface Roughness Rz is 100 nm or More, and 1/10 or Less of Thickness

To secure the above number of crystal grains in the thickness direction and recrystallization ratio, the foil is rolled by a strong rolling reduction rate and final annealed at a relatively high temperature. By going through these processes, it could be confirmed that the surface roughness Rz was 1000 nm or less even with usual products with gloss and 6000 nm or less even with dulled products with no gloss. Note that, the Rz, as prescribed in JIS B 0601: 2001, is expressed by the difference in the thickness direction between the most recessed part and the most projecting part at a reference length. Needless to say, the lower the upper limit of the surface roughness, the better, but this depends on the actual process conditions. The stainless steel foil according to the present invention can be finished to a surface roughness Rz of 1/10 or less of the thickness. If the surface roughness Rz is 1/10 or less of the thickness, a stable press-formability (plastic deformation ability) can be secured.

The lower limit of the surface roughness Rz is not particularly set. However, it is not realistic to make the surface roughness Rz 0 nm, so the realistically obtainable minimum value of 100 nm may be made the lower limit.

In general, when annealing ultrathin stainless steel foil, if the stainless steel foil has no plastic deformation ability, due to passage through the rolls during the annealing process, kinks occur and fracture arises leading to damage to the sheets. Further, if stainless steel foil does not have a large elongation at break, it becomes difficult to flatten the relief on the surface. Therefore, the rolling reduction rate and final annealing temperature affect the surface roughness.

In the present invention, after being rolled with a strong reduction rate, if annealing by a relatively high temperature in accordance with the dislocation density, due to refinement of the crystal grains, plastic deformation easily occurs in the thickness direction. Due to the higher elongation, damage to the foil can be avoided. As a result, it is believed that a high thickness precision can be secured.

On the other hand, even if rolling with a strong reduction rate, if annealing by a relatively low temperature after that, even if the crystal grains can be refined, the dislocation density cannot be sufficiently reduced. Therefore, the elongation at break ends up becoming less than 10%, so it becomes difficult to flatten the relief on the surface and becomes impossible to secure a surface roughness Rz of 6000 nm or less.

Further, if annealing at a relatively high temperature without rolling by a strong reduction rate, the annealing is performed under circumstances where the nucleation sites for recrystallization are not sufficiently obtained, so the crystal grains coarsen and the number of crystal grains in the thickness direction ends up becoming about two grains. For this reason, plastic deformation ends up becoming difficult in the thickness direction, so due to passage through the rolls during the annealing process, kinks occur and fracture arises.

Further, if not rolling with a strong reduction rate and if further annealing at a relatively low temperature, for a similar reason as the above, plastic deformation becomes difficult in the thickness direction. On top of that, the elongation at break ends up becoming less than 10%. For this reason, due to passage through the rolls during the annealing process, kinks occur and fracture arises. On top of this, it becomes difficult to flatten the relief on the ultrathin stainless steel foil surface.

Elongation at Break of 10% or More

The elongation at break is a comprehensive indicator of workability and is related to the plastic deformation ability and the dislocation density. The dislocation density is closely related to the annealing temperature, so if the final annealing temperature is 950° C. or more, an elongation at break of 10% or more can be secured. Furthermore, in the stainless steel foil according to the present invention, since the plastic deformation ability is also secured, it was confirmed that the elongation at break became further better.

The elongation at break is strongly dependent on the annealing temperature, so it was confirmed that in the stainless steel foil according to the present invention, an elongation at break of 10% or more could be secured in the case of an annealing temperature of 950° C. and of 20% or more could be secured in the case of an annealing temperature of 1050° C.

The larger the elongation at break, the more preferable, but the upper limit is not particularly set. The realistic maximum value of the elongation at break is about 50%, so this may also be made the upper limit.

Laminated with a Resin Film

The stainless steel foil according to the present invention, in the same way as usual laminated stainless steel foil, may be laminated with a resin film at its surface to obtain a laminated stainless steel foil. By laminating the resin film, it is possible to improve the corrosion resistance in the electrolyte and possible to raise the applicability to lithium ion battery and other such battery cases.

The resin film may be laminated on both surfaces of the stainless steel foil or may be laminated on either of the surfaces.

Regarding the peeling strength of the stainless steel foil and the resin, the necessary performance is obtained by providing the surface of the stainless steel foil with a chromate conversion coating layer of a suitable thickness. For example, PLT 5 discloses the art of providing at least one surface of a stainless steel foil with a thickness 2 to 200 nm chromate conversion coating layer and laminating that surface with polyolefin-based resin containing functional groups having polarity.

Further, whitening of the resin after press-forming can be prevented by optimizing the resin design. Specifically, it is sufficient to make the resin after hot lamination amorphous. For that purpose, it is sufficient to increase the cooling rate at the time of hot lamination. For example, the cooling rate in the range of 120° C. to 80° C. is preferably made 20° C./s or more.

2. Method of Production of Stainless Steel Foil

Next, the method of production of the stainless steel foil according to the present invention will be explained.

The process of production of the stainless steel foil according to the present invention is substantially the same as the process of production of normal stainless steel foil. That is, a stainless steel strip is rolled to a foil, then is washed on its surface and final annealed and, if necessary, is temper rolled (tension leveler) to produce stainless steel foil. Note that, depending on the thickness of the stainless steel strip of the material used for the foil rolling, the foil rolling process may be divided into several stages (multistage rolling) and process annealing may be performed between the foil rolling stages. However, to obtain the stainless steel foil according to the present invention, as explained before, it is important to control the rolling reduction rate at the final foil rolling and the temperature at the final annealing.

Rolling Reduction Rate

In foil rolling, it is possible to roll the foil by a strong rolling reduction rate so as to introduce dislocations forming nucleation sites for recrystallization in the stainless steel. The higher the rolling reduction rate, the more the dislocations introduced increase. The dislocation density is controlled together by the rolling reduction rate and the annealing treatment performed after being rolled. Therefore, when rolling foil two times or more, the final foil rolling, that is, the foil rolling right before the final annealing, is preferably performed with a strong rolling reduction rate.

In the case of ferritic stainless steel, since steel is more resistant to work hardening compared with austenitic stainless steel, that is, since it is difficult to increase the dislocation density, a stronger rolling reduction rate is required. The rolling reduction rate is preferably made 50% or more. Further, if possible, it is preferably made 60% or more, more preferably 70% or more.

The extent of dislocations introduced by rolling differs depending on the steel type. For example, in the case of ferritic stainless steel, work hardening is more difficult compared with austenitic stainless steel and it is harder to increase the dislocation density, so stronger reduction is necessary. Therefore, the rolling reduction rate in the foil rolling before the final annealing is preferably made 50% or more. From the viewpoint of securing the dislocation density, it is preferably made 60% or more, more preferably 70% or more.

On the other hand, in the case of austenitic stainless steel, the rolling reduction rate does not have to be raised as much as ferritic stainless steel. The rolling reduction rate in foil rolling before the final annealing may be made 30% or more. From the viewpoint of securing the dislocation density, it is preferably made 40% or more, more preferably 45% or more.

Note that, the rolling reduction rate is defined by the following equation:

$$\text{Rolling reduction rate} = (\text{thickness before rolling} - \text{thickness after rolling})/(\text{thickness before rolling}).$$

In rolling foil, the thickness is of course reduced. Introduction of dislocations is also an objective. The upper limit of the rolling reduction rate is not particularly set. However, theoretically, a rolling reduction rate of 100% is impossible, so the realistic upper limit of the rolling reduction rate is 95% or so.

The lower limit of the rolling reduction rate, while depending on the final thickness of the stainless steel foil, if possible preferably is made 40% or more, more preferably 45% or more.

When rolling foil divided over several stages, it is preferable to control the structure of the material in the intermediate foil rolling operations and following process annealing as well.

In this case as well, the same procedure as with the final foil rolling is preferably used. That is, the rolling reduction rate in each foil rolling operation is preferably made 30% or more. However, as explained above, foil rolling right before the final annealing is most effective, so the rolling reduction rate of the final foil rolling operation is preferably set higher than the rolling reduction rate of the other foil rolling operations.

Annealing Temperature

The annealing after foil rolling (final annealing) plays the important role of reducing the dislocation density and promoting recrystallization. For the stainless steel foil according to the present invention, as explained above, the objective is to reduce the dislocation density and promote recrystallization while suppressing grain growth to simultaneously secure good plastic deformation ability and elongation at break.

In the case of the stainless steel foil according to the present invention, in the case of austenitic stainless steel, the annealing temperature is preferably made 950° C. to 1050° C. If less than 950° C., the dislocation density is not reduced, so good elongation at break cannot be secured. On the other hand, if over 1050° C., the crystals coarsen, the number of crystal grains in the thickness direction decreases, the distribution of crystal grain diameters becomes broader, and a plastic deformation ability cannot be obtained. To secure good elongation at break and improve the press-formability (plastic deformation ability), the lower limit of the annealing temperature is preferably somewhat higher than 950° C., preferably is 960° C., more preferably is 970° C.

From the viewpoint of suppressing coarsening of the crystal, the upper limit of the annealing temperature is made somewhat lower than 1050° C., preferably is made 1040° C., more preferably 1030° C.

Similarly, if ferritic stainless steel, the annealing temperature is preferably made 850° C. to 950° C. If less than 850° C., the dislocation density is not reduced, so the good elongation at break cannot be secured. On the other hand, if over 950° C., the crystals become coarser, the number of crystal grains in the thickness direction is reduced, the distribution of crystal grain diameter becomes broader, and plastic deformation ability cannot be obtained. To secure good elongation at break and improve press-formability (plastic deformation ability), the lower limit of the annealing temperature is preferably somewhat higher than 850° C., preferably is 860° C., more preferably is 870° C.

The upper limit of the annealing temperature also, from the viewpoint of suppressing coarsening of the crystals, is somewhat lower than 950° C., preferably is 940° C., more preferably is 930° C.

Annealing Holding Time

The time for holding the stainless steel foil at the abovementioned annealing temperature is preferably 3 seconds to 30 seconds. If less than 3 seconds, the heat treatment becomes insufficient and the recrystallization does not sufficiently proceed so the recrystallization ratio prescribed in the present invention cannot be obtained. On the other hand, if over 30 seconds, the recrystallized grains coarsen, the number of crystal grains in the thickness direction is decreased, and the distribution of crystal grain diameters becomes broader, so good plastic deformation ability cannot be obtained.

Annealing Atmosphere

The annealing atmosphere is made a hydrogen or argon or other rare gas atmosphere so as to prevent the surface of the stainless steel foil from nitriding. Note that, the annealing atmosphere preferably does not contain any nitrogen at all, but nitrogen unavoidably entering from the atmosphere can be allowed to a certain extent. To make the nitrogen concentration of the surface layer 1.0 mass % or less, the nitrogen concentration in the annealing atmosphere is preferably 0.1 vol % or less.

Process Annealing

When performing the foil rolling step several times, while the process annealing conditions are not particularly set, in the same way as the final annealing, in the case of austenitic stainless steel, 950° C. to 1050° C. is preferable, while in the case of ferritic stainless steel, 850° C. to 950° C. is preferable. Preferably, the crystal grain boundaries also become nuclei for recrystallization and are introduced in large amounts before foil rolling, so it is preferable to make the temperature the above temperature range to suppress coarsening of the recrystallized grains.

EXAMPLES

As working examples of the stainless steel foil according to the present invention, a stainless steel strip having the chemical composition of SUS304 (austenitic stainless steel) and a stainless steel strip having the chemical composition of SUS430 (ferritic stainless steel) were rolled under the rolling conditions described in Tables 1 and 2 by a foil rolling mill to produce ultrathin stainless steel foils having the thicknesses described in Tables 1 and 2.

Here, the "cold rolling reduction rate" indicates the rolling reduction rate at the foil rolling process right before the final annealing, the "finishing annealing temperature" indicates the temperature in the final annealing process performed after the end of the rolling process, and the "holding time" indicates the time for holding the stainless steel foil at the finishing annealing temperature.

The annealing atmosphere was made a mixed gas of 0.1 vol % nitrogen-99.9 vol % hydrogen or a mixed gas of 25 vol % nitrogen-75 vol % hydrogen.

The recrystallization ratio was obtained by obtaining a cross-section in the rolling direction for examination, polishing it to a mirror finish, etching it, then examining it to find the area of the crystal grains recrystallized in a range of the total thickness×500 μm width and calculating (area of recrystallized crystals)/(examined area).

The nitrogen concentration of the surface layer was measured by Auger electron spectroscopy (AES). The concentration down to a depth of 30 nm from the stainless steel foil surface was measured. The average nitrogen concentration down to a depth where the oxygen concentration became a concentration of half of the peak value was made the nitrogen concentration of the surface layer.

The number of crystal grains in the thickness direction was found by cutting out a test piece in the thickness direction, polishing the cross-section, etching it, observing it under a microscope and measuring the crystal grain diameter based on JIS G 0551 to calculate the average crystal grain diameter, dividing the thickness by the average crystal grain diameter, and using the quotient.

The average crystal grain diameter was calculated by polishing, then etching the surface of a test piece, observing it through a microscope, then measuring the crystal grain diameter based on JIS G 0551. Further, the area ratio of crystal grains having a t/3 (μm) or more crystal grain diameter was found by differentiating crystal grains having a t/3 (μm) or more crystal grain diameter from crystal grains having a less than t/3 (μm) crystal grain diameter based on the calculated crystal grain diameters and calculating the ratio of crystal grains having a t/3 (μm) or more crystal grain diameter in a measurement field (100×100 μm) as the area ratio.

The elongation at break was evaluated by cutting out a JIS No. 13B test piece from the produced stainless steel foil and performing a tensile test on this by a test method based on JIS Z 2241. For the thickness precision, a commercially available probe-type surface roughness measuring device was used to evaluate the maximum height Rz at a reference length of 0.25 mm based on JIS B 0601.

Further, using the finishing (final) annealed stainless steel foil, one surface was provided with a 10 nm chromate conversion coating layer then was laminated with a polypropylene film while the other surface was laminated with a polyester film or nylon film to prepare approximately 100 mm square samples. The centers of these samples were press-formed by a vertical 40 mm×horizontal 30 mm, R1.5 mm punch, R1.5 mm die, and clearance 0.3 mm as conditions to evaluate the maximum depths at which no wrinkling or cracks form. The greater the thickness, the greater the maximum forming depth, so in the case of a thickness of less than 30 μm, a forming depth of 3.0 mm or more was deemed good while in the case of a thickness of 30 μm or more, a forming depth of 3.5 mm or more was deemed good. The results of evaluation are shown in Table 1 and Table 2.

TABLE 1

| Test no. | Steel type | Thickness μm | Cold rolling reduction rate % | Finishing annealing Temp. °C | Time s | Atmosphere vol % | Recrystallization ratio % | Surface layer nitrogen concentration mass % |
|---|---|---|---|---|---|---|---|---|
| Comp. Ex. 1 | SUS304 | 20 | 60 | 950 | 5 | 0.1%N$_2$—99.9%H$_2$ | 100 | 0.8 |
| Comp. Ex. 2 | SUS304 | 20 | 60 | 960 | 5 | 0.1%N$_2$—99.9%H$_2$ | 100 | 0.6 |
| Comp. Ex. 3 | SUS304 | 20 | 60 | 970 | 5 | 0.1%N$_2$—99.9%H$_2$ | 100 | 0.7 |
| Ex. 1 | SUS304 | 20 | 80 | 950 | 5 | 0.1%N$_2$—99.9%H$_2$ | 100 | 0.8 |
| Ex. 2 | SUS304 | 20 | 50 | 950 | 3 | 0.1%N$_2$—99.9%H$_2$ | 95 | 0.8 |
| Ex. 3 | SUS304 | 25 | 50 | 970 | 5 | 0.1%N$_2$—99.9%H$_2$ | 90 | 0.5 |
| Ex. 4 | SUS304 | 25 | 50 | 1000 | 5 | 0.1%N$_2$—99.9%H$_2$ | 95 | 0.6 |
| Ex. 5 | SUS304 | 25 | 50 | 1025 | 5 | 0.1%N$_2$—99.9%H$_2$ | 100 | 0.5 |
| Ex. 6 | SUS304 | 5 | 95 | 950 | 5 | 0.1%N$_2$—99.9%H$_2$ | 90 | 0.4 |
| Ex. 7 | SUS304 | 5 | 50 | 1000 | 3 | 0.1%N$_2$—99.9%H$_2$ | 100 | 0.4 |
| Ex. 8 | SUS304 | 10 | 50 | 1000 | 5 | 0.1%N$_2$—99.9%H$_2$ | 100 | 0.4 |
| Ex. 9 | SUS304 | 15 | 50 | 970 | 30 | 0.1%N$_2$—99.9%H$_2$ | 100 | 0.5 |
| Ex. 10 | SUS304 | 30 | 30 | 1050 | 5 | 0.1%N$_2$—99.9%H$_2$ | 95 | 0.7 |
| Ex. 11 | SUS304 | 30 | 40 | 1050 | 5 | 0.1%N$_2$—99.9%H$_2$ | 100 | 0.7 |
| Ex. 12 | SUS304 | 30 | 45 | 1000 | 15 | 0.1%N$_2$—99.9%H$_2$ | 100 | 0.6 |
| Ex. 13 | SUS304 | 40 | 50 | 970 | 10 | 0.1%N$_2$—99.9%H$_2$ | 100 | 0.5 |
| Ex. 14 | SUS304 | 50 | 80 | 1025 | 5 | 0.1%N$_2$—99.9%H$_2$ | 100 | 0.8 |
| Ex. 15 | SUS304 | 45 | 90 | 1000 | 5 | 0.1%N$_2$—99.9%H$_2$ | 100 | 0.7 |
| Comp. Ex. 4 | SUS304 | 15 | 10 | 1100 | 5 | 0.1%N$_2$—99.9%H$_2$ | 100 | 0.6 |
| Comp. Ex. 5 | SUS304 | 20 | 25 | 1050 | 5 | 0.1%N$_2$—99.9%H$_2$ | 100 | 0.5 |
| Comp. Ex. 6 | SUS304 | 25 | 50 | 1100 | 5 | 0.1%N$_2$—99.9%H$_2$ | 100 | 0.5 |
| Comp. Ex. 7 | SUS304 | 30 | 40 | 1100 | 5 | 0.1%N$_2$—99.9%H$_2$ | 100 | 0.7 |
| Comp. Ex. 8 | SUS304 | 20 | 60 | 650 | 5 | 0.1%N$_2$—99.9%H$_2$ | 0 | 0.5 |
| Comp. Ex. 9 | SUS304 | 30 | 50 | 800 | 5 | 0.1%N$_2$—99.9%H$_2$ | 0 | 0.5 |
| Comp. Ex. 10 | SUS304 | 30 | 20 | 650 | 5 | 0.1%N$_2$—99.9%H$_2$ | 0 | 0.4 |
| Comp. Ex. 11 | SUS304 | 50 | 80 | 650 | 5 | 0.1%N$_2$—99.9%H$_2$ | 0 | 0.6 |
| Comp. Ex. 12 | SUS304 | 45 | 90 | 900 | 5 | 0.1%N$_2$—99.9%H$_2$ | 50 | 0.5 |
| Comp. Ex. 13 | SUS304 | 20 | 30 | 1050 | 5 | 25%N$_2$—75%H$_2$ | 100 | 5.0 |
| Ref. Ex. 14 | SUS304 | 100 | 70 | 1150 | 5 | 0.1%N$_2$—99.9%H$_2$ | 100 | 0.5 |

| Test no. | No. of crystal grains | Crystal grain diameter μm | Ratio of crystal grains with grain diameters of sheet thickness/3 or more Area % | Elongation at break % | Surface roughness Rz μm | Forming depth mm |
|---|---|---|---|---|---|---|
| Comp. Ex. 1 | 3.4 | 5.9 | 21 | 10 | 0.79 | 2.9 |
| Comp. Ex. 2 | 3.2 | 6.3 | 23 | 14 | 0.77 | 2.8 |
| Comp. Ex. 3 | 3.0 | 6.7 | 25 | 18 | 0.75 | 2.9 |
| Ex. 1 | 5.0 | 4.0 | 10 | 14 | 0.79 | 3.5 |
| Ex. 2 | 6.0 | 3.3 | 8 | 14 | 0.78 | 3.6 |
| Ex. 3 | 8.9 | 2.8 | 8 | 32 | 0.73 | 3.7 |
| Ex. 4 | 7.9 | 3.2 | 9 | 38 | 0.71 | 3.8 |
| Ex. 5 | 6.9 | 3.6 | 11 | 44 | 0.68 | 3.2 |
| Ex. 6 | 5.0 | 1.0 | 3 | 13 | 0.65 | 3.3 |
| Ex. 7 | 3.0 | 1.7 | 20 | 10 | 0.10 | 3.1 |
| Ex. 8 | 4.0 | 2.5 | 20 | 12 | 0.24 | 3.3 |
| Ex. 9 | 5.0 | 3.0 | 8 | 14 | 0.41 | 3.6 |
| Ex. 10 | 7.8 | 3.8 | 15 | 22 | 0.93 | 3.6 |
| Ex. 11 | 9.7 | 3.1 | 10 | 27 | 0.80 | 3.9 |
| Ex. 12 | 10.7 | 2.8 | 5 | 29 | 0.85 | 4.2 |
| Ex. 13 | 11.0 | 3.6 | 3 | 35 | 0.75 | 4.0 |
| Ex. 14 | 10.0 | 5.0 | 6 | 42 | 0.57 | 4.5 |
| Ex. 15 | 11.8 | 3.8 | 3 | 48 | 0.68 | 4.0 |
| Comp. Ex. 4 | 0.5 | 30.0 | 80 | 9 | 1.34 | 2.2 |
| Comp. Ex. 5 | 1.2 | 16.7 | 70 | 10 | 0.85 | 2.5 |
| Comp. Ex. 6 | 2.0 | 12.5 | 65 | 20 | 0.78 | 2.7 |
| Comp. Ex. 7 | 2.5 | 12.0 | 60 | 20 | 0.7 | 2.8 |
| Comp. Ex. 8 | 6.4 | 3.1 | 10 | 3 | 6.5 | 2.6 |
| Comp. Ex. 9 | 9.6 | 3.1 | 8 | 5 | 6.7 | 2.6 |
| Comp. Ex. 10 | 7.4 | 4.1 | 12 | 1 | 6.45 | 2.7 |
| Comp. Ex. 11 | 16.0 | 3.1 | 3 | 3 | 6.65 | 3.2 |

TABLE 1-continued

| | | | | | | |
|---|---|---|---|---|---|---|
| Comp. Ex. 12 | 15.0 | 3.0 | 7 | 8 | 6.7 | 3.3 |
| Comp. Ex. 13 | 3.0 | 6.7 | 14 | 15 | 0.84 | 2.6 |
| Ref. Ex. 14 | 20.0 | 5.0 | 2 | 41 | 0.96 | 6.0 |

TABLE 2

| Test no. | Steel type | Thickness μm | Cold rolling reduction rate % | Finishing annealing Temp. °C. | Finishing annealing Time s | Finishing annealing Atmosphere vol % | Recrystallization ratio % | Surface layer nitrogen concentration mass % | Crystal No. of crystal grains | Crystal grain diameter μm | Ratio of crystal grains with grain diameters thickness/3 or more of sheet Area % | Elongation at break % | Surface roughness Rz μm | Forming depth mm |
|---|---|---|---|---|---|---|---|---|---|---|---|---|---|---|
| Comp. Ex. 15 | SUS430 | 10 | 50 | 850 | 4 | 0.1%N$_2$—99.9%H$_2$ | 95 | 0.3 | 3.4 | 2.9 | 30 | 14 | 0.65 | 2.9 |
| Comp. Ex. 16 | SUS430 | 20 | 50 | 870 | 4 | 0.1%N$_2$—99.9%H$_2$ | 95 | 0.2 | 3.5 | 5.7 | 40 | 22 | 0.77 | 2.8 |
| Comp. Ex. 17 | SUS430 | 20 | 70 | 900 | 3 | 0.1%N$_2$—99.9%H$_2$ | 100 | 0.3 | 4.1 | 4.9 | 25 | 23 | 0.76 | 2.7 |
| Comp. Ex. 18 | SUS430 | 30 | 50 | 900 | 4 | 0.1%N$_2$—99.9%H$_2$ | 100 | 0.3 | 3.3 | 9.1 | 30 | 30 | 0.74 | 3.1 |
| Comp. Ex. 19 | SUS430 | 30 | 50 | 950 | 4 | 0.1%N$_2$—99.9%H$_2$ | 100 | 0.2 | 3.5 | 8.6 | 50 | 27 | 0.80 | 2.9 |
| Ex. 16 | SUS430 | 30 | 80 | 900 | 4 | 0.1%N$_2$—99.9%H$_2$ | 100 | 0.2 | 5.2 | 5.8 | 18 | 32 | 0.77 | 3.5 |
| Ex. 17 | SUS430 | 35 | 95 | 900 | 4 | 0.1%N$_2$—99.9%H$_2$ | 100 | 0.3 | 5.8 | 6.0 | 15 | 30 | 0.76 | 3.6 |
| Ex. 18 | SUS430 | 40 | 90 | 870 | 10 | 0.1%N$_2$—99.9%H$_2$ | 100 | 0.3 | 6.0 | 6.7 | 5 | 34 | 0.72 | 4.0 |
| Ex. 19 | SUS430 | 50 | 80 | 900 | 4 | 0.1%N$_2$—99.9%H$_2$ | 100 | 0.3 | 8.5 | 5.9 | 8 | 32 | 0.78 | 3.9 |
| Ex. 20 | SUS430 | 60 | 60 | 925 | 4 | 0.1%N$_2$—99.9%H$_2$ | 100 | 0.5 | 8.3 | 7.2 | 10 | 25 | 0.82 | 3.9 |
| Ex. 21 | SUS430 | 10 | 70 | 850 | 3 | 0.1%N$_2$—99.9%H$_2$ | 90 | 0.5 | 4.0 | 2.5 | 15 | 13 | 0.75 | 3.1 |
| Ex. 22 | SUS430 | 20 | 80 | 850 | 4 | 0.1%N$_2$—99.9%H$_2$ | 95 | 0.4 | 4.5 | 4.4 | 9 | 24 | 0.76 | 3.4 |
| Ex. 23 | SUS430 | 20 | 90 | 870 | 4 | 0.1%N$_2$—99.9%H$_2$ | 100 | 0.4 | 4.2 | 4.8 | 18 | 24 | 0.75 | 3.2 |
| Ex. 24 | SUS430 | 25 | 70 | 900 | 4 | 0.1%N$_2$—99.9%H$_2$ | 100 | 0.4 | 4.0 | 6.3 | 8 | 27 | 0.80 | 3.4 |
| Ex. 25 | SUS430 | 25 | 80 | 870 | 4 | 0.1%N$_2$—99.9%H$_2$ | 100 | 0.4 | 3.5 | 7.1 | 17 | 26 | 0.79 | 3.2 |
| Comp. Ex. 20 | SUS430 | 20 | 50 | 600 | 4 | 0.1%N$_2$—99.9%H$_2$ | 0 | 0.6 | 6.5 | 3.1 | 17 | 5 | 3.5 | 1.9 |
| Comp. Ex. 21 | SUS430 | 30 | 10 | 900 | 4 | 0.1%N$_2$—99.9%H$_2$ | 100 | 0.5 | 1.8 | 16.7 | 2 | 10 | 1.2 | 2.0 |
| Comp. Ex. 22 | SUS430 | 30 | 50 | 1000 | 4 | 0.1%N$_2$—99.9%H$_2$ | 100 | 0.5 | 2.1 | 14.3 | 3 | 15 | 0.9 | 2.1 |
| Comp. Ex. 23 | SUS430 | 30 | 50 | 950 | 4 | 25%N$_2$—75%H$_2$ | 100 | 3.0 | 3.1 | 9.7 | 4 | 17 | 0.85 | 2.0 |

As shown in Table 1, the working examples of the austenitic stainless steel foil according to the present invention all satisfy the provisions of the invention relating to crystal grains. As a result, when the thickness was less than 30 μm, the forming depth was 3.0 mm or more, while when the thickness was 30 μm or more, the forming depth was 3.5 mm or more.

As opposed to this, Comparative Examples 1 to 3 had area ratios of crystal grains having t/3 (μm) or more crystal grain diameters over 20%, so were inferior in forming depths.

Further, Comparative Examples 4 to 7 had low rolling reduction rates or high finishing annealing temperatures or both, so did not satisfy all of the provisions of the invention relating to crystal grains. As a result, they were inferior in forming depth.

Further, Comparative Examples 8 to 12 had low finishing annealing temperatures, so were low in recrystallization ratios. As a result, they were inferior in forming depths. Comparative Example 13 had a high nitrogen concentration contained in the atmosphere at the time of finishing annealing, so became high in nitrogen concentration at the surface layer. As a result, it was inferior in forming depth.

Note that, Reference Example 14 relates to a conventional example with a large thickness.

As shown in Table 2, the working examples of the ferritic stainless steel foil according to the present invention all satisfy the provisions of the invention relating to crystal grains. As a result, when the thickness was less than 30 μm, the forming depth was 3.0 mm or more, while when the thickness was 30 μm or more, the forming depth was 3.5 mm or more.

As opposed to this, Comparative Examples 15 to 19 had area ratios of crystal grains having t/3 (μm) or more crystal grain diameters over 20%, so were inferior in forming depths.

Further, Comparative Example 20 had a low finishing annealing temperature, so had a low recrystallization ratio. As a result, it was inferior in forming depth. Comparative Examples 21 and 22 had a low rolling reduction rate or high finishing annealing temperature, so did not satisfy the provisions of the invention relating to the number of crystal grains in the thickness direction and average crystal grain diameter. As a result, they were inferior in forming depths. Comparative Example 23 had a high nitrogen concentration contained in the atmosphere at the time of finishing annealing, so had a high nitrogen concentration of the surface layer. As a result, it was inferior in forming depth.

From the above results, in austenitic stainless steel foil, if comparing the working examples and comparative examples, it could be confirmed that there is a 0.5 mm or more difference in the forming depth. Further, in ferritic stainless steel foil, if comparing the working examples and comparative examples, it could be confirmed that there is a 0.4 mm or more difference in the forming depth. This difference is an extremely significant difference as shown below. That is, when stainless steel foil is, for example, applied to a battery case mounted in a smartphone or other small sized and light weight electronic product, a battery case of a thickness of about several mm is demanded. In view of such a situation, if the forming depth becomes 0.4 mm or more larger, this corresponds to 10% or more of the thickness of the battery case and contributes greatly to increase of the battery capacity. Therefore, the effect of the present invention is extremely large.

INDUSTRIAL APPLICABILITY

The stainless steel foil according to the present invention can be applied to a battery case etc. of a lithium ion battery etc. for a small sized electronic product.

The invention claimed is:

1. A stainless steel foil having a thickness of 5 μm to 60 μm, wherein a recrystallization ratio of said stainless steel foil is 90% to 100%,
  a surface layer of said stainless steel foil has a nitrogen concentration of 1.0 mass % or less,
  three or more crystal grains are contained in the thickness direction of said stainless steel foil, an average crystal grain diameter "d" of said crystal grains is 1 μm to 10 μm, and,
  when said thickness is "t" (μm), an area ratio of crystal grains having a crystal grain diameter of t/3 (μm) or more is 20% or less,
  wherein the area ratio is calculated by measuring the average crystal grain diameter of the crystal grains present in a predetermined measurement field at the surface of the stainless steel foil based on JIS G 0551, and dividing the measured crystal grains having a crystal grain diameter of t/3 (μm) or more from the measured crystal grains having a crystal grain diameter of less than t/3 (μm) to calculate the ratio of the measured crystal grains having a crystal grain diameter of t/3 (μm) or more in the area of the measurement field.

2. The stainless steel foil according to claim 1, wherein said thickness is 5 μm to 25 μm.

3. The stainless steel foil according to claim 1, wherein a surface roughness Rz is 100 nm or more, and ¹/₁₀ or less of the thickness.

4. The stainless steel foil according to claim 1, wherein an elongation at break is 10% or more.

5. The stainless steel foil according to claim 1, wherein said stainless steel foil is ferritic stainless steel foil.

6. The stainless steel foil according to claim 1, wherein said stainless steel foil is austenitic stainless steel foil.

7. The stainless steel foil according to claim 1, wherein a resin film is laminated on at least one surface of said stainless steel foil.

8. The stainless steel foil according to claim 2, wherein a surface roughness Rz is 100 nm or more, and ¹/₁₀ or less of the thickness.

9. The stainless steel foil according to claim 2, wherein an elongation at break is 10% or more.

10. The stainless steel foil according to claim 3, wherein an elongation at break is 10% or more.

11. The stainless steel foil according to claim 2, wherein said stainless steel foil is ferritic stainless steel foil.

12. The stainless steel foil according to claim 3, wherein said stainless steel foil is ferritic stainless steel foil.

13. The stainless steel foil according to claim 4, wherein said stainless steel foil is ferritic stainless steel foil.

14. The stainless steel foil according to claim 2, wherein said stainless steel foil is austenitic stainless steel foil.

15. The stainless steel foil according to claim 3, wherein said stainless steel foil is austenitic stainless steel foil.

16. The stainless steel foil according to claim 4, wherein said stainless steel foil is austenitic stainless steel foil.

17. The stainless steel foil according to claim 2, wherein a resin film is laminated on at least one surface of said stainless steel foil.

18. The stainless steel foil according to claim 3, wherein a resin film is laminated on at least one surface of said stainless steel foil.

19. The stainless steel foil according to claim 4, wherein a resin film is laminated on at least one surface of said stainless steel foil.

20. The stainless steel foil according to claim 5, wherein a resin film is laminated on at least one surface of said stainless steel foil.

* * * * *